Patented Feb. 10, 1953

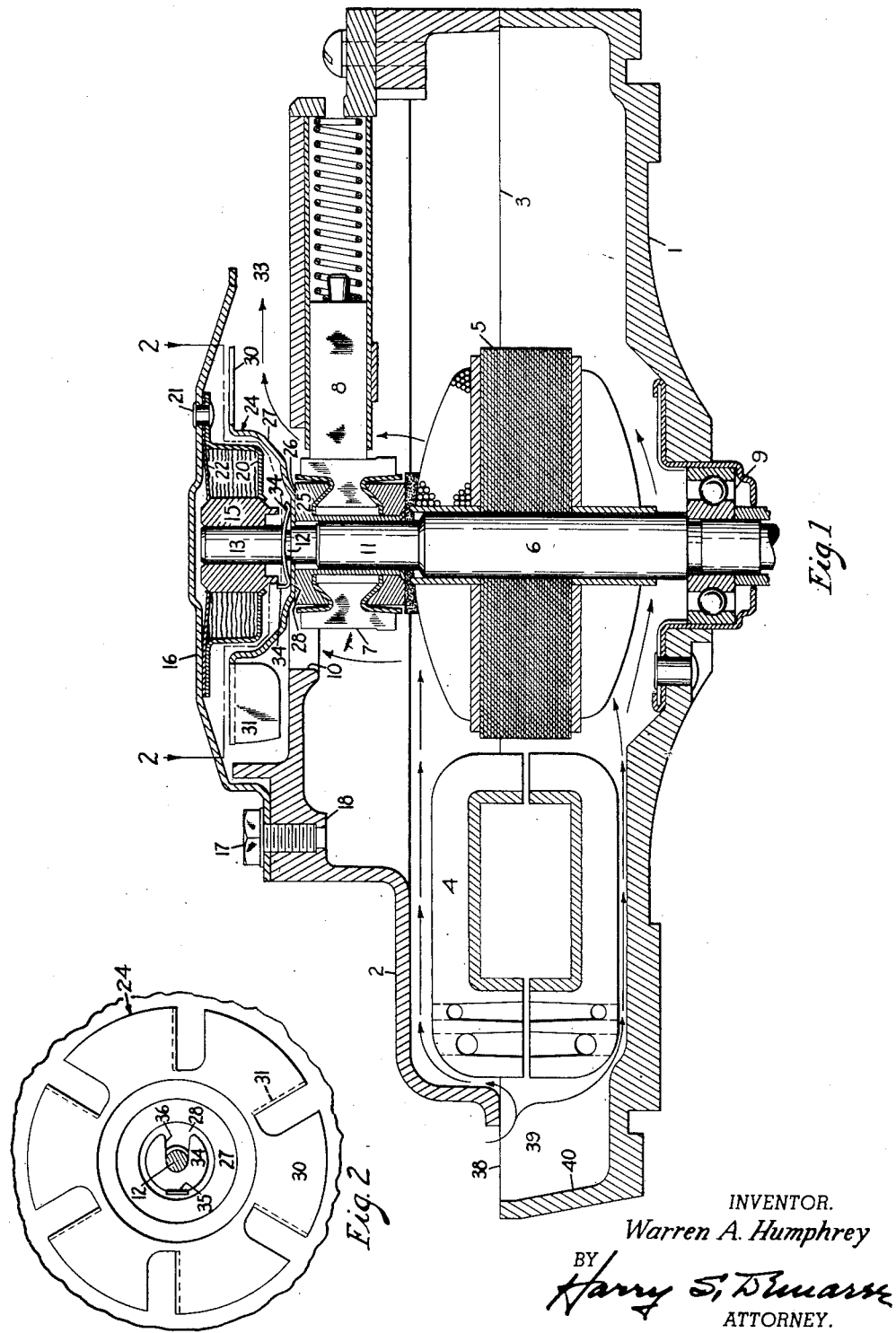

2,628,320

UNITED STATES PATENT OFFICE 2,628,320

MOTOR VENTILATING SYSTEM

Warren A. Humphrey, Canton, Ohio, assignor to The Hoover Company, North Canton, Ohio, a corporation of Ohio Application October 30, 1950, Serial No. 192,971

5 Claims. (Cl. 310—62)

My invention is particularly concerned with electric motors and means for ventilating same to remove waste heat unavoidably generated in the operation of the motor.

It is an object of my invention to provide a ventilating system for electric motor structures such as are commonly used in suction cleaners of the type in which the motor is encased within an insulating housing forming the ventilating fan chamber and motor bearing mounting means. Examples of this type of construction are illustrated in the patent to Snyder No. 2,287,911, granted June 30, 1942, and the patent to Daiger No. 2,361,748, granted October 31, 1944.

It is a further object of my invention to provide a motor construction of the above described type in which the ventilating fan is so mounted that the same may readily be removed from the motor shaft in order to permit ready disassembly of the motor housing construction, the ventilating fan does not significantly add to the over-all height of the motor unit and the ventilating fan nests around and protects one of the motor bearings. Modern suction cleaning devices are particularly limited with respect to height by the height of the electric drive motor. Even very small reductions in the height of the motor are highly important in permitting reductions in the over-all height of the suction cleaning apparatus to permit the same to be passed under furniture which is close to the floor. For this reason, reduction in the height occupied by the motor ventilating structure results in a net gain and permits a reduction in the over-all height of the cleaning apparatus. In addition to the foregoing, the ventilating fan must be simple, economical and easily assembled to and disassembled from the motor. The present invention achieves these objects in all particulars.

Other objects and advantages of the invention will become apparent as the description proceeds when taken in connection with the accompanying drawing in which:

Figure 1 is a cross sectional view of a motor housing structure for use in suction cleaning apparatuses of the type generally illustrated in the above mentioned U. S. Letters Patent; and Figure 2 is a view taken along the line 2—2 of Figure 1 looking in the direction of the arrows.

As illustrated in the accompanying drawing, my apparatus comprises a motor housing preferably constructed of electrical insulating material comprising a lower section 1 and an upper section 2 which meet along the line indicated by the reference character 3. The sections 1 and 2 are secured together by any suitable means not shown. A motor field structure indicated generally at 4 is suitably supported within the housings 1 and 2. The field 4 cooperates with an armature 5 secured to a motor shaft 6 which carries a commutator 7 positioned to be engaged by brushes 8 carried by the upper half 2 of the housing. The lower end of the shaft 6 is supported by and extends through a ball bearing 9 carried by the lower half 1 of the housing. The upper housing section 2 is provided with a central opening 10, somewhat larger than the commutator 7, forming the air inlet to a ventilating fan structure to be described more fully hereinafter. The commutator 7 may extend into the opening 10 as shown without ill effect. That portion of the shaft 6 upon which the commutator 7 is mounted is reduced as indicated in 11 in a conventional fashion, and carries an end section 13 journalled in a composition bearing 15. The shaft section 13 is provided with a circumferential groove 12 between the commutator and the bearing 15. The composition bearing structure 15 is carried by a top closure plate 16 which is secured to the upper section 1 of the housing by a plurality of studs 17 of which only one is illustrated. These studs, as shown in Figure 1, screw into suitable bosses 18 formed integrally with the upper section 2 of the motor housing. The sections 1 and 2 of the motor housing are so united that the ball bearing 9 and composition bearing 15 are in alignment to provide proper alignment for the shaft structure 6, motor armature 5 and commutator 7. The composition bearing 15 is supported by an open bottom centering and supporting cup-like member 20 riveted as at 21 to the cover 16 to position the bearing 15 in alignment with the bearing 9. A flat disc-shaped spring 22 is also secured to the cap 16 by rivets 21 and bears on the upper end of the composition bearing 15 as shown in Figure 1 to hold the same firmly in the supporting cup 20.

The upper end of the commutator structure 7 is defined by a conventional type of commutator bar locking V-ring member 25 which has a flat upwardly directed end face 26.

A ventilating fan indicated generally at 24 is mounted on the shaft section 13. The fan 24 comprises a central cup-shaped portion 27 having a flat central portion 28 resting upon the flat end face 26 of the V-ring 25 and surrounding the shaft 11. The cup-shaped portion of the fan 27 partially nests the bearing structure and bearing retainer 20 and terminates in an outwardly projecting flange 30 provided with a plurality of radially extending and downwardly projecting tabs 31 forming centrifugal fan blades. As is shown in Figure 1, the flange 30 and blades 31 of the fan 24 are positioned between the top wall of the section 2 of the motor housing and the cover 16 and extend radially outwardly of the margin of the opening 10 so that this opening forms an annular inlet passage for ventilating air around the commutator 7. The space between the cover 16 and the top wall of the motor housing section 2 forms an annular fan chamber provided with an exhaust outlet 33 at one side thereof.

The flat central portion 28 of the fan 24 is provided with a central opening snugly engaging the shaft 13 just below the groove 12. The fan 24 is secured by a general circular convex spring 34 having a slot 36 just wide enough to admit the reduced portion of shaft section 13 defining the inner wall of groove 12. When the spring 34 is in its assembled position, see Figure 1, the upper central portion thereof presses against the upper shaft shoulder defining the groove 12 and the peripheral portion of the spring firmly presses the flat section 28 of the fan 24 into frictional driving engagement with the face 26 of the commutator V-ring 25. The spring 34 is provided with an upturned tab 35 to facilitate gripping of the same with a suitable tool for insertion or removal. The flat section 28 of the fan structure is just slightly larger than the spring 34 so as to prevent accidental displacement thereof.

The coplaner edges of the casing sections 1 and 2 are spaced apart adjacent the field coil 4 to provide an air inlet opening 38 for an air passageway 39 formed by the portion 40 of the casing section 1 which extends beyond the corresponding portion of casing section 2 to define the opening 38.

When the motor is in operation, the rotation of the fan 24 causes the air to flow through the opening 38 and passage 39 as shown by the arrows to cool the field 4 and then to flow around the armature and commutator through the opening 10 into the fan 24 from whence it is discharged through the passage 33. In this manner, a continuous flow of cooling air over all portions of the motor is provided and the commutator dust is blown directly out of the casing without being blown over any portion of the motor proper. The fan 24 forms a barrier which prevents dust from reaching the bearing. Thus the air blast is such as to blow commutator dust upwardly away from the ball bearing 9 and the bearing structure 15 at the top of the motor is shielded by the imperforate portions of the fan 24 which nest the bearing 15.

To disassemble the apparatus, the studs 17 are removed from the casing section 2 after which the cap 16 and its associated bearing structure is pulled from the shaft section 13. Next, the spring 34 is removed from its seat in the groove 12 of the shaft after which the ventilating fan 24 may be lifted from the shaft section 13. When the fan 24 is removed, the section 2 of the motor housing may be disengaged from section 1 and lifted therefrom to expose the interior of the motor structure completely. The last mentioned step is easily possible because no portion of the motor structure overhangs the portion of housing section 2 defining the central air inlet 10 after removal of the ventilating fan and cover plate 16 with its associated bearing structure.

Thus, in accordance with the present construction, the ventilating fan is secured in a simple and economical manner to the motor shaft by a structure which does not require any precision fitting or fine machine work and has very small vertical dimensions. Additionally, the imperforate central portion of the fan 24 nests around and protects the upper bearing so that the net vertical dimension of the fan 24 additional to that also occupied by the bearing is very small.

I claim:

1. An electric motor structure comprising a casing, an electric motor in said casing including a shaft projecting beyond one end of said casing, a cover member secured to said one end of said casing to form a bearing and ventilating fan chamber therewith, a bearing carried by said cover member within said chamber and receiving the projecting portion of said shaft, said end of said casing being formed with an opening providing communication between said chamber and the interior of said casing adjacent said shaft, means forming a shoulder on said shaft, a ventilating fan having a central portion resting on said shoulder about said shaft and a peripheral portion carrying fan blades positioned around said bearing in said chamber and extending radially outwardly of said shaft beyond said opening, a second shoulder on said shaft spaced from said central portion of said fan, and a curved spring washer having a slot receiving said shaft and bearing between said second shoulder and said central portion of said fan to maintain said fan in frictional driving engagement with said first mentioned shoulder.

2. Apparatus according to claim 1 in which said motor includes a commutator on said shaft having a locking ring on one end thereof forming said first mentioned shoulder.

3. Apparatus according to claim 1 in which said central portion of said fan is surrounded by a flange extending axially of said shaft around said spring washer, and said flange has a diameter slightly larger than said spring washer to prevent accidental lateral displacement of said spring washer from said shaft.

4. A motor structure comprising a shaft, an armature on said shaft, means forming a flat surface about said shaft normal to the axis thereof, a ventilating fan on said shaft having a flat circular section resting on said flat surface about said shaft and joining a circumferential flange extending axially of said shaft in spaced relation thereto, a circular convex spring provided with a slot having a width less than the diameter of said shaft extending from its peripheral portion to its center, said shaft being formed with a peripheral groove having a base portion of a diameter less than the width of said slot, and said spring having the rim portion thereof bearing on said circular section within said flange and embracing said shaft within said groove with the central portion of said spring engaging a shoulder of said groove to press said fan against said flat surface.

5. Apparatus according to claim 4 in which said motor includes a commutator mounted on said shaft and having an end portion forming said flat surface.

WARREN A. HUMPHREY.

REFERENCES CITED

The following references are of record in the file of this patent:

UNITED STATES PATENTS

| Number | Name | Date |
|---|---|---|
| 1,751,424 | Rosenthal | Mar. 18, 1930 |
| 2,156,047 | Arnold | Apr. 25, 1939 |
| 2,244,406 | Schonwald | June 3, 1941 |
| 2,345,910 | Fawcett | Apr. 4, 1944 |

FOREIGN PATENTS

| Number | Country | Date |
|---|---|---|
| 572,715 | Great Britain | Oct. 19, 1945 |